United States Patent [19]

Idage et al.

[11] Patent Number: 5,905,135
[45] Date of Patent: May 18, 1999

[54] METHOD OF PREPARING POLYCARBONATES BY SOLID STATE POLYMERIZATION

[75] Inventors: Bhaskar Bhairavnath Idage; Swaminathan Sivaram, both of Pune, India; Godavarthi Satyanaryana Varadarajan, Niskayuna, N.Y.; Joseph Anthony King, Jr., Midlothian, Va.

[73] Assignee: General Electric Company, Schenectady, N.Y.

[21] Appl. No.: 08/986,448

[22] Filed: Dec. 8, 1997

[51] Int. Cl.⁶ .................................................. C08G 64/00
[52] U.S. Cl. .................................................. 528/196
[58] Field of Search ............................... 528/196

[56] References Cited

U.S. PATENT DOCUMENTS

| | | | |
|---|---|---|---|
| 4,948,871 | 8/1990 | Fukuoka et al. | 528/481 |
| 5,204,377 | 4/1993 | Fukawa et al. | 521/60 |
| 5,717,056 | 2/1998 | Varadarajan et al. | 528/196 |

FOREIGN PATENT DOCUMENTS 2017890  11/1970  Germany .
1057732  8/1967  United Kingdom .

OTHER PUBLICATIONS

Database WPI, Section Ch, Week 9443, Derwent Publications Ltd., London, GB; Class A23, AN 94–347191, XP002077267 & JP: 06 271659 A (Asahi Kasei Kogyo KK), Sep. 27, 1994.

Database WPI, Section Ch, Week 9305, Derwent Publications Ltd., London, GB; Class A23, AN 93–040690, XP002077268 & JP 04 366128 A (Daicel Chem Ind Ltd), Dec. 18, 1992.

Database WPI, Section Ch, Week 9309, Derwent Publications Ltd., London, GB; Class A23, AN 93–071177, XP002077269 & JP 05 017565 A (Daicel Chem Ind Ltd), Jan. 26, 1993.

*Primary Examiner*—Terressa Mosley
*Attorney, Agent, or Firm*—Noreen C. Johnson; Douglas E. Stoner

[57] ABSTRACT

Crystallization of precursor polycarbonates prior to solid state polymerization is achieved by contact with a non-solvent comprising, at least in part, a dialkyl carbonate such as dimethyl carbonate. The non-solvent can be a mixture, typically of dimethyl carbonate with water or an alkanol such as methanol.

13 Claims, No Drawings

METHOD OF PREPARING POLYCARBONATES BY SOLID STATE POLYMERIZATION

BACKGROUND OF THE INVENTION

This invention relates to the preparation of polycarbonates, and more particularly to a method for their preparation by solid state polymerization.

Solid state polymerization is disclosed, for example, in U.S. Pat. Nos. 4,948,871, 5,204,377 and 5,214,073, the disclosures of which are incorporated herein. It involves three steps: a first step of forming a prepolymer, typically by melt polymerization (i.e., transesterification) of a dihydroxyaromatic compound such as bisphenol A with a diaryl carbonate such as diphenyl carbonate; a second step of crystallizing the prepolymer; and a third step of building the molecular weight of the crystallized prepolymer by heating to a temperature between its glass transition temperature and its melting temperature. Use of this method is of increasing interest by reason of its effectiveness and environmental benefits.

The aforementioned U.S. Pat. No. 5,204,377 describes a solid state polymerization method which requires the use of a crystallized prepolymer having a specific surface area of at least 0.2 $m^2/g$. This is a rather high surface area and is difficult to achieve, requiring, for example, high shear conditions. It is of interest, therefore, to develop a solid state polymerization method which does not require crystallized prepolymers having such a high surface area.

SUMMARY OF THE INVENTION

The present invention provides a method for solid state polymerization which is easily performed and which does not impose onerous requirements, such as surface area requirements, on the intermediates. In particular, preparation of polycarbonates of high molecular weight can be achieved with the use of crystallized prepolymers having relatively low surface areas.

The invention is a method for preparing an aromatic polycarbonate which comprises:

(A) contacting a solid, amorphous aromatic precursor polycarbonate with at least one organic non-solvent therefor, said non-solvent comprising at least one dialkyl carbonate, to form a surface-crystallized polycarbonate; and (B) polymerizing said surface-crystallized polycarbonate by solid state polymerization.

DETAILED DESCRIPTION; PREFERRED EMBODIMENTS

Polycarbonates which may be prepared by the method of this invention typically comprise structural units of the formula

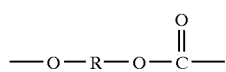

(I)

wherein at least about 60% of the total number of R groups are aromatic organic radicals and the balance thereof are aliphatic, alicyclic, or aromatic radicals. Preferably, each R is an aromatic organic radical and more preferably a radical of the formula

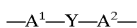

(II)

wherein each $A^1$ and $A^2$ is a monocyclic divalent aryl radical and Y is a bridging radical in which one or two carbonate atoms separate $A^1$ and $A^2$. Such radicals are derived from dihydroxyaromatic compounds of the formulas HO—R—OH and HO—$A^1$—Y—$A^2$—OH respectively. For example, $A^1$ and $A^2$ generally represent unsubstituted phenylene, especially p-phenylene which is preferred, or substituted derivatives thereof. The bridging radical Y is most often a hydrocarbon group and particularly a saturated group such as methylene, cyclohexylidene, or isopropylidene which is preferred. Thus, the most preferred polycarbonates are those derived entirely or in part from 2,2-bis(4-hydroxyphenyl) propane, also known as "bisphenol A".

The essential starting material in step A of the method of this invention is a precursor polycarbonate. It may be a polycarbonate oligomer of the type produced by the first step of a melt polycarbonate process or by bischloroformate oligomer preparation followed by hydrolysis and/or endcapping and isolation. Such oligomers most often have an intrinsic viscosity in the range of about 0.06–0.30 dug, all intrinsic viscosity values herein being as determined in chloroform at 25° C.

The precursor polycarbonate may be a branched polycarbonate, formed by the reaction of a linear polycarbonate or its precursor(s) with a branching agent such as 1,1,1-tris(4-hydroxyphenyl)ethane. It may also be a copolycarbonate, particularly a copolycarbonate oligomer or high molecular weight copolycarbonate containing units adapted to maximize solvent resistance. Hydroquinone and methylhydroquinone carbonate units are particularly suitable for this purpose, as disclosed in U.S. Pat. No. 4,920, 200. Such units will typically comprise about 25–50% of total carbonate units in the polymer. Conversion to the branched polycarbonate or copolycarbonate may precede or occur simultaneously with the conversion of the precursor polycarbonate to an enhanced crystallinity polymer.

The precursor polycarbonate may also be a recycled polycarbonate. For example, recycled polymer from compact disks may be employed. Its method of original preparation is immaterial; i.e., recycled polycarbonate originally prepared by interfacial polymerization, by melt polymerization or from bischloroformates may be employed.

Such recycled material typically has a molecular weight which has been degraded from that of the originally polymerized material as shown by an intrinsic viscosity in the range of about 0.25–1.0 dl/g. It may be obtained from scrap polycarbonate by dissolution in a chlorinated organic solvent such as chloroform, methylene chloride or 1,2-dichloroethane followed by filtration of the insoluble material or other art-recognized procedures for separation of non-polycarbonate constituents. Other types of polycarbonate, such as interfacially prepared polycarbonate and polycarbonate extruder wastes, may also be employed as precursors.

Prior to performing step A, it is within the scope of the invention, particularly when the precursor polycarbonate is a recycled material, to dissolve it in a chlorinated hydrocarbon as solvent. Illustrative chlorinated hydrocarbons are methylene chloride, chloroform, 1,2-dichloroethane, chlorobenzene and o-dichlorobenzene. The chloroaliphatic hydrocarbons are preferred, with methylene chloride and 1,2-dichloroethane being most preferred.

Dissolution of the precursor polycarbonate in the solvent may take place at any temperature. Typical temperatures are from about 0° C. to the boiling point of the solvent, with about 20–100° C. generally being preferred. So long as an amount of solvent effective to dissolve the polycarbonate is employed, its proportion is not critical.

Dissolution of the precursor polycarbonate generally leaves behind various insoluble materials, as illustrated by metallic coatings when the precursor polycarbonate is from optical disks, for example. The invention further contemplates removal of said insoluble materials from the polycarbonate solution. This may be achieved by such conventional operations as decantation, filtration and centrifugation.

The precursor polycarbonate is frequently associated with colored impurities, which may appear in the polycarbonate itself or in the solution thereof in the chlorinated solvent. Various embodiments of the invention, therefore, include a step of removing color from the amorphous polycarbonate solution following other removal steps. One method for color discharge is treatment while in solution with a mineral acid, preferably hydrochloric acid, said acid typically being in solution in an alkanol such as methanol. Another is contact of said solution with a solid that absorbs color bodies, such as activated charcoal or a crosslinked resin, which may be neutral or may be an ion exchange resin. Another is washing with a solution of sodium gluconate. Still another is washing of the resin, after precipitation as described hereinafter, with non-solvent in an amount sufficient to dissolve color bodies.

Many commercially employed polycarbonates are end-capped with a monohydroxyaromatic compound such as phenol or p-cumylphenol. Such an endcapping agent, when present, can inhibit solid state polymerization. Therefore, it is frequently preferred to add during the dissolution step at least one dihydroxyaromatic or dihydroxyaliphatic compound as a modifying reagent to produce hydroxy end groups. Suitable compounds include resorcinol, hydroquinone, methylhydroquinone, catechol, bisphenols, ethylene glycol, propylene glycol, pentaerythritol, glycerol, glyceryl monopalmitate and glyceryl monostearate, with catechol and bisphenol A often being preferred.

The proportion of modifying reagent is generally a proportion at least theoretically effective to convert the amorphous polycarbonate in the solution to a material having about 20–80% (by number), preferably 40–60%, hydroxy end groups. A suitable proportion may be determined by simple experimentation.

In step A, the precursor polycarbonate, which may be a solid or a solution as prepared by the above-described steps, is contacted with at least one organic non-solvent therefor. Said non-solvent comprises at least one dialkyl carbonate, which may be used alone or in combination with another non-solvent. Suitable dialkyl carbonates include those in which the alkyl groups have 1–4 carbon atoms, as illustrated by dimethyl carbonate and diethyl carbonate. Dimethyl carbonate is usually preferred by reason of its relative availability and low cost and particular suitability.

When the dialkyl carbonate is used in combination with another non-solvent, said other non-solvent is typically water or a lower alkanol, the term "lower" designating alkyl radicals having up to seven carbon atoms. The preferred lower alkanols are those containing 1–4 carbon atoms, especially methanol and ethanol and preferably methanol.

The dialkyl carbonate is generally present in major proportion in any non-solvent mixture; that is, in a proportion greater than 50% by volume. Preferably, the dialkyl carbonate comprises at least about 65%, more preferably about 65–85% and most preferably about 65–75%, by volume.

These preferences are based, at least in part, on the physical form of the surface-crystallized polycarbonate which is the product of step A, particularly when it is produced from pellets of the type typically generated by commercial extrusion equipment and the like. Production of a surface-crystallized polycarbonate which is itself in pellet form, with little or no powder formation, is preferable. It is also preferable that the pellets and any associated powder be free flowing rather than adhered into aggregates by sticking and clumping. In the more preferred and most preferred ranges of non-solvent composition, powder formation, sticking and clumping are minimized.

Surface crystallization may be accomplished by merely contacting the precursor polycarbonate with the non-solvent composition, typically at temperatures in the range of about 20–50° C. The weight ratio of the non-solvent to the precursor polycarbonate is not critical but may be adjusted for the sake of convenience; ratios in the range of about 4–6:1 are typical.

As disclosed in the aforementioned patents and in copending, commonly owned application Ser. No. 08/767, 740, the surface crystallization step may be achieved in the absence or presence of catalysts. Suitable catalysts (when employed) include alkali metal and alkaline earth metal hydroxides, hydrides, borohydrides, aluminum hydrides and aryloxides; compounds of such elements as zinc, boron, silicon, germanium, tin and lead; onium compounds such as quaternary ammonium and quaternary phosphonium salts, including carboxylates such as maleates; antimony, manganese, titanium and zirconium compounds; and bioxyanion carboxylates and phenoxides. Catalyst proportions, when employed, are typically in the range of about 50–200 ppm based on precursor polycarbonate.

Contrary to the above-identified disclosure in U.S. Pat. No. 5,204,377, it has been found that the surface-crystallized polycarbonate produced in step A in the method of this invention does not have a particularly high surface area. More particularly, the surface area is generally not at least 0.2 m$^2$/g as previously considered necessary or preferable. Nevertheless, the surface-crystallized polycarbonate is readily polymerizable by solid state polymerization.

Also, contrary to the statement in the aforementioned U.S. Pat. No. 4,948,871 that an overall crystallinity of at least 5% is required for solid state polymerization, it is believed that the overall crystallinity of the surface-crystallized polycarbonate is immaterial to its utility. Experience indicates that the only requirement is a significant surface crystallinity, typically at least 5%. Thus, the crystallinity or non-crystallinity of internal regions of the polycarbonate does not appear to have a significant effect on its polymerizability in the solid state.

Step B is the solid state polymerization operation. It may be conducted under art-recognized conditions. These include a temperature between the glass transition temperature and the melting temperature of the surface-crystallized polycarbonate, most often about 10–50° C. below its melting temperature. In general, temperatures in the range of about 150–270° and especially about 180–250° C. are suitable, especially for bisphenol A homopolycarbonates. While catalysts are not necessary, any catalyst employed in step A will most often still be present and its presence is not detrimental.

The method of this invention is illustrated by the following examples. Intrinsic viscosities were determined in methylene chloride at 20° C.

EXAMPLE 1

A 250-ml round-bottomed flask equipped with an addition funnel, reflux condenser and stirrer was charged with 20 g of a bisphenol A polycarbonate oligomer having an intrinsic viscosity of 0.16 dl/g, 100 ml of dimethyl carbonate and 100 ppm, based on oligomer, of tetramethylammonium hydrogen maleate. The mixture was stirred at 270° C. for 10 minutes, after which the dimethyl carbonate was removed by distillation under reduced pressure and the residue was dried at 80° C. for 2–3 hours. The solid material was sieved and the particles passing through a 25 mesh screen were collected. The resulting surface-crystallized polycarbonate oligomer had an intrinsic viscosity of 0.16 dl/g, a glass transition temperature of 115° C., a melting temperature of 231° C. and a crystallinity of 33%.

The surface-crystallized oligomer was subjected to solid state polymerization conditions in a fluidized bed reactor under a flow of nitrogen at 180° C. for 1 hour, 210° C. for 1 hour, 220° C. for 2 hours and 230° C. for 2 hours. The resulting polycarbonate had an intrinsic viscosity of 0.55 dl/g, a glass transition temperature of 147° C. and a melting temperature of 250° C.

EXAMPLE 2

The procedure of Example 1 was repeated, substituting for the polycarbonate oligomer a commercially available bisphenol A polycarbonate in pellet form, said polycarbonate having an intrinsic viscosity of 0.36 dl/g, and (in Examples 3–5) for the dimethyl carbonate various mixtures of dimethyl carbonate and methanol. The surface-crystallized polycarbonate had an intrinsic viscosity of 0.36 dl/g, a glass transition temperature of 134° C., a melting temperature of 234° C. and a crystallinity of 32%. The polycarbonate obtained by solid state polymerization had an intrinsic viscosity of 0.55 dl/g, a glass transition temperature of 149° C. and a melting temperature of 261° C.

EXAMPLES 3–5

The procedure of Example 2 was repeated, substituting various dimethyl carbonate-methanol mixtures for the dimethyl carbonate. The results are given in the following table; PC=polycarbonate, SSP=solid state polymerized, Tm=melting temperature.

|  |  | Surface-crystallized PC |  | SSP PC |  |
| --- | --- | --- | --- | --- | --- |
| Example | Methanol, % by vol. | Tm, ° C. | Crystallinity, % | Sticking/ clumping | Powder, % |
| 3 | 10 | 224 | 25 | Yes | 10 |
| 4 | 20 | 217 | 23 | Yes | 3 |
| 5 | 30 | 218 | 20 | No | 1 |

EXAMPLE 6

A 100-g sample of bisphenol A polycarbonate recovered from extruder drips is dissolved in 700 ml of 1,2-dichloroethane at 80° C., with vigorous stirring. The solution is centrifuged and the solid residue is removed and discarded. Dimethyl carbonate is added to the polycarbonate solution to precipitate the polycarbonate as a crystalline solid, which is separated, washed with ethyl acetate until colorless and dried in vacuum at 80° C. The resulting surface-crystallized polycarbonate is capable of solid state polymerization by the method of Example 2.

What is claimed is:

1. A method for preparing an aromatic polycarbonate which comprises:

(A) contacting a solid, amorphous aromatic precursor polycarbonate with at least one organic non-solvent therefor, said non-solvent comprising at least one dialkyl carbonate, to form a surface-crystallized polycarbonate; and (B) polymerizing said surface-crystallized polycarbonate by solid state polymerization.

2. A method according to claim 1 wherein the dialkyl carbonate is dimethyl carbonate.

3. A method according to claim 2 wherein the polycarbonate comprises structural units of the formula

(I)

wherein at least about 60% of the total number of R groups are aromatic organic radicals and the balance thereof are aliphatic, alicyclic, or aromatic radicals.

4. A method according to claim 3 wherein the polycarbonate is a bisphenol A homopolycarbonate.

5. A method according to claim 2 wherein the non-solvent consists of dimethyl carbonate.

6. A method according to claim 2 wherein the non-solvent is a mixture of dimethyl carbonate and water or a lower alkanol.

7. A method according to claim 6 wherein the non-solvent is methanol.

8. A method according to claim 7 wherein the dialkyl carbonate comprises about 65–85% by volume of the non-solvent mixture.

9. A method according to claim 8 wherein the dialkyl carbonate comprises about 65–75% by volume of the non-solvent mixture.

10. A method according to claim 2 wherein step A is conducted in the presence of a catalyst.

11. A method according to claim 10 wherein the catalyst is a quaternary ammonium or quaternary phosphonium salt.

12. A method according to claim 11 wherein the catalyst is a quaternary ammonium carboxylate.

13. A method according to claim 12 wherein the catalyst is tetramethylammonium hydrogen maleate.

* * * * *